(12) United States Patent
Hourai (10) Patent No.: US 7,490,627 B2
(45) Date of Patent: Feb. 17, 2009

(54) BUTTERFLY VALVE WITH WATER-FILLING FUNCTION

(75) Inventor: Akinobu Hourai, Hirakata (JP)

(73) Assignee: Kubota Corporation, Osaka (JP)

( * ) Notice: Subject to any disclaimer, the term of this patent is extended or adjusted under 35 U.S.C. 154(b) by 82 days.

(21) Appl. No.: 11/347,087

(22) Filed: Feb. 3, 2006

(65) Prior Publication Data

US 2006/0192167 A1 Aug. 31, 2006

(30) Foreign Application Priority Data

Feb. 25, 2005 (JP) .............................. 2005-049830

(51) Int. Cl.
*F16K 1/22* (2006.01)
(52) U.S. Cl. .................. 137/625.31; 251/121; 251/208; 251/306; 251/317
(58) Field of Classification Search ......... 251/305–308, 251/314, 317.01, 208, 121, 317; 137/625.31
See application file for complete search history.

(56) References Cited

U.S. PATENT DOCUMENTS

| | | | | |
|---|---|---|---|---|
| 3,298,677 A | * | 1/1967 | Anderson | 251/305 |
| 3,960,177 A | * | 6/1976 | Baumann | 137/625.31 |
| 4,036,469 A | * | 7/1977 | Robinson | 251/306 |
| 4,479,510 A | * | 10/1984 | Bey | 137/625.31 |
| 4,676,481 A | * | 6/1987 | Hayes | 251/306 |
| 4,712,768 A | * | 12/1987 | Herr et al. | 251/306 |
| 5,465,756 A | * | 11/1995 | Royalty et al. | 137/625.31 |
| 6,131,882 A | * | 10/2000 | Suzuki | 251/306 |
| 6,758,458 B2 | * | 7/2004 | Ando et al. | 251/208 |

FOREIGN PATENT DOCUMENTS

| | | | |
|---|---|---|---|
| JP | 59-101054 | | 7/1984 |
| JP | 62-6568 | * | 1/1987 |
| JP | 07-208615 | * | 8/1995 |
| JP | 2003-120829 | | 4/2003 |
| JP | 2003-254450 | | 9/2003 |
| JP | 2003-329148 | | 11/2003 |
| JP | 2004-218786 | | 8/2004 |

* cited by examiner

*Primary Examiner*—John Bastianelli
(74) *Attorney, Agent, or Firm*—Fildes & Outland, P.C.

(57) ABSTRACT

A butterfly valve having a pair of disk tails provided at the back of a valve body in the rotation direction in an opening operation, a water flow hole formed in each disk tails, and a steady region found in relationship between loss factor and opening degree of the valve body where the loss factor becomes substantially constant with a change in opening degree of the valve body when water is filled from the water flow hole. Water filling velocity in an upstream pipe of the butterfly valve from the water flow hole, and pressure head upstream of the butterfly valve are set. Optimal value of the loss factor is determined based on the set water filling velocity and pressure head, and a total opening area of the water flow holes is set so that the loss factor equals the optimal value in the steady region.

2 Claims, 8 Drawing Sheets

PRIOR ART

PRIOR ART

BUTTERFLY VALVE WITH WATER-FILLING FUNCTION

BACKGROUND OF THE INVENTION

1. Field of the Invention

The present invention relates to a butterfly valve having a water-filling function, and to a technology of a valve for supplying a constant amount of fluid when a pipe is filled with water.

2. Description of the Related Art

In the prior art, in the initial filling of water or refilling of water when laying a pipe, the pipe was often damaged by a water hammer or the like if the water was filled up with water suddenly. Therefore, a butterfly valve provided in the middle of the pipe was opened to a small degree to fill a downstream pipe line with water by supplying a small amount of water.

However, with a general butterfly valve, it was difficult to control the quantity of water flow by opening the valve to a small degree, thus a constant amount of water could not be supplied. Therefore, it was difficult to previously compute required time between the start of water filling and when the pipe became full of water.

Figure 4:
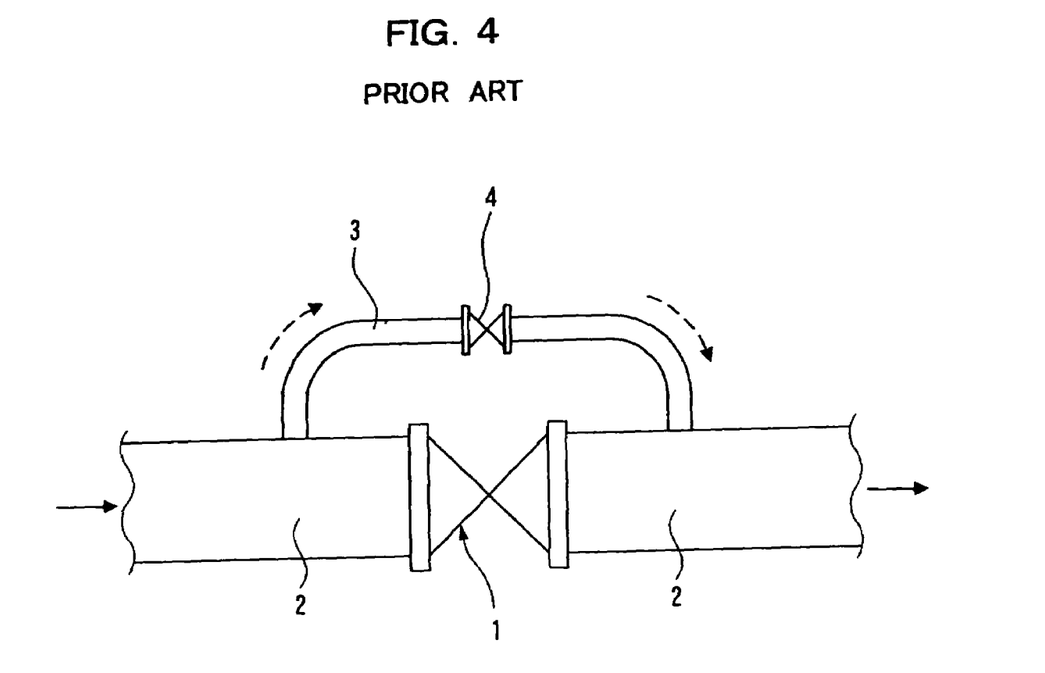
FIG. 4 shows a water-filling mechanism including a sub-pipe and a sub-pipe valve according to a conventional art.

As a measure of such problems, there is a configuration, as shown in FIG. 4, in which a main pipe 2 having a butterfly valve 1 is provided with a sub-pipe 3 for water filling, and a sub-pipe valve 4 is provided in the middle of the sub-pipe 3. One end of the sub-pipe 3 is connected to the main pipe 2 positioned upstream of the butterfly valve 1, and the other end of the sub-pipe 3 is connected to the main pipe 2 positioned downstream of the butterfly valve 1.

According to such structure, in the filling of water, the butterfly valve 1 is closed and the sub-pipe valve 4 is opened, whereby the fluid inside the main pipe 2 flows from the upstream side of the butterfly valve 1 to the downstream side of the butterfly valve 1 via the sub-pipe 3 to fill a downstream pipe line in small amounts. It should be noted that usually the diameter of the sub-pipe 3 is set to be ⅕ of the diameter of the main pipe 2, thus the cross-section of the flow channel of the sub-pipe 3 is ¹⁄₂₅ of the cross-section of the flow channel of the main pipe 2, according to a standard and the like.

However, in the configuration in which the sub-pipe 3 and the sub-pipe valve 4 are provided as described above, there was a problem that such configuration takes up a large space for setting up pipes. As a measure of such problems, a butterfly valve 10 with a water-filling function as shown in FIG. 5 through FIG. 8 is considered to be used.

Figure 5:
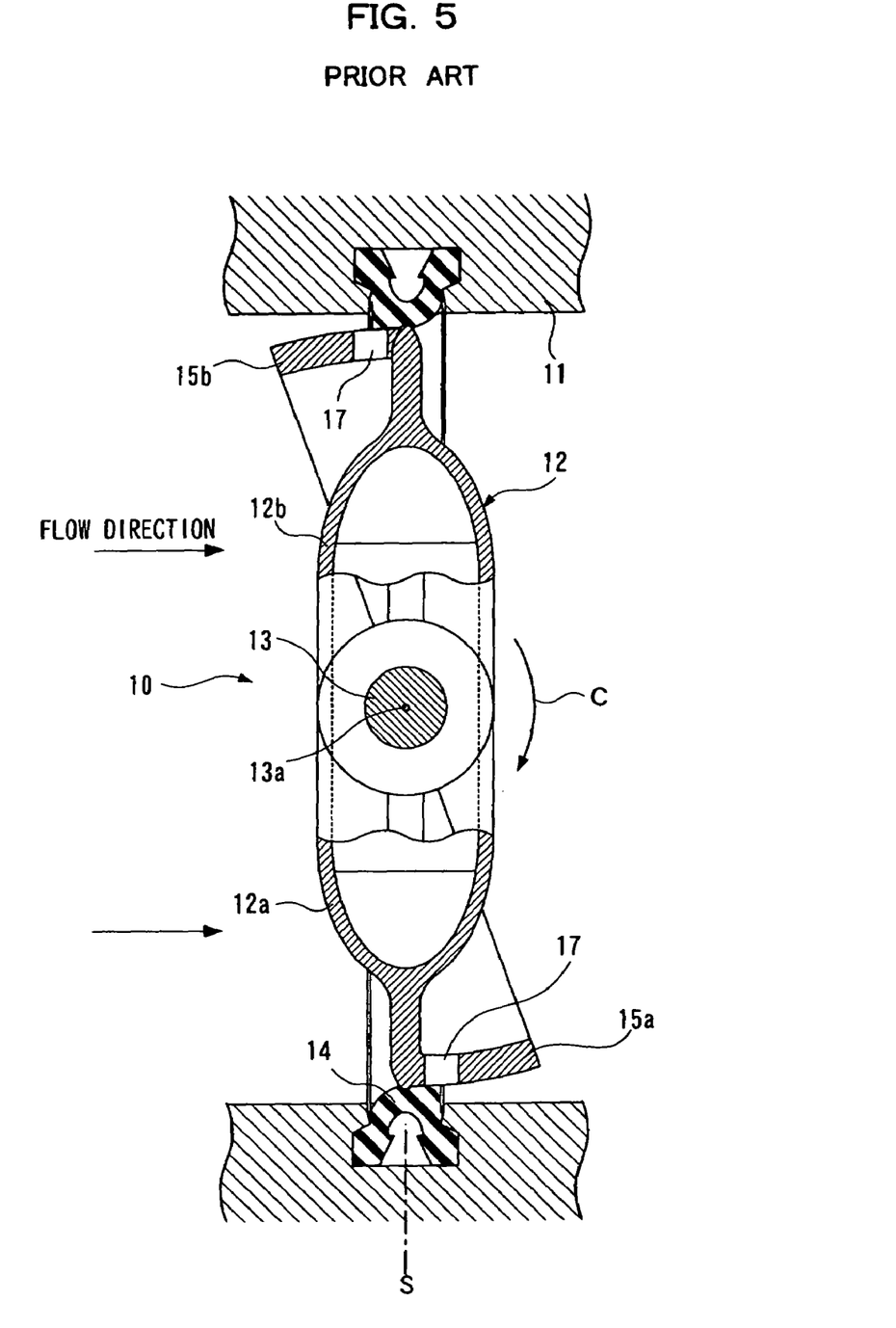
FIG. 5 is a cross sectional view at a right angle with respect to a shaft center of a valve rod of a conventional butterfly valve with a water-filling function, showing a state in which a valve body is completely closed.
Figure 8:
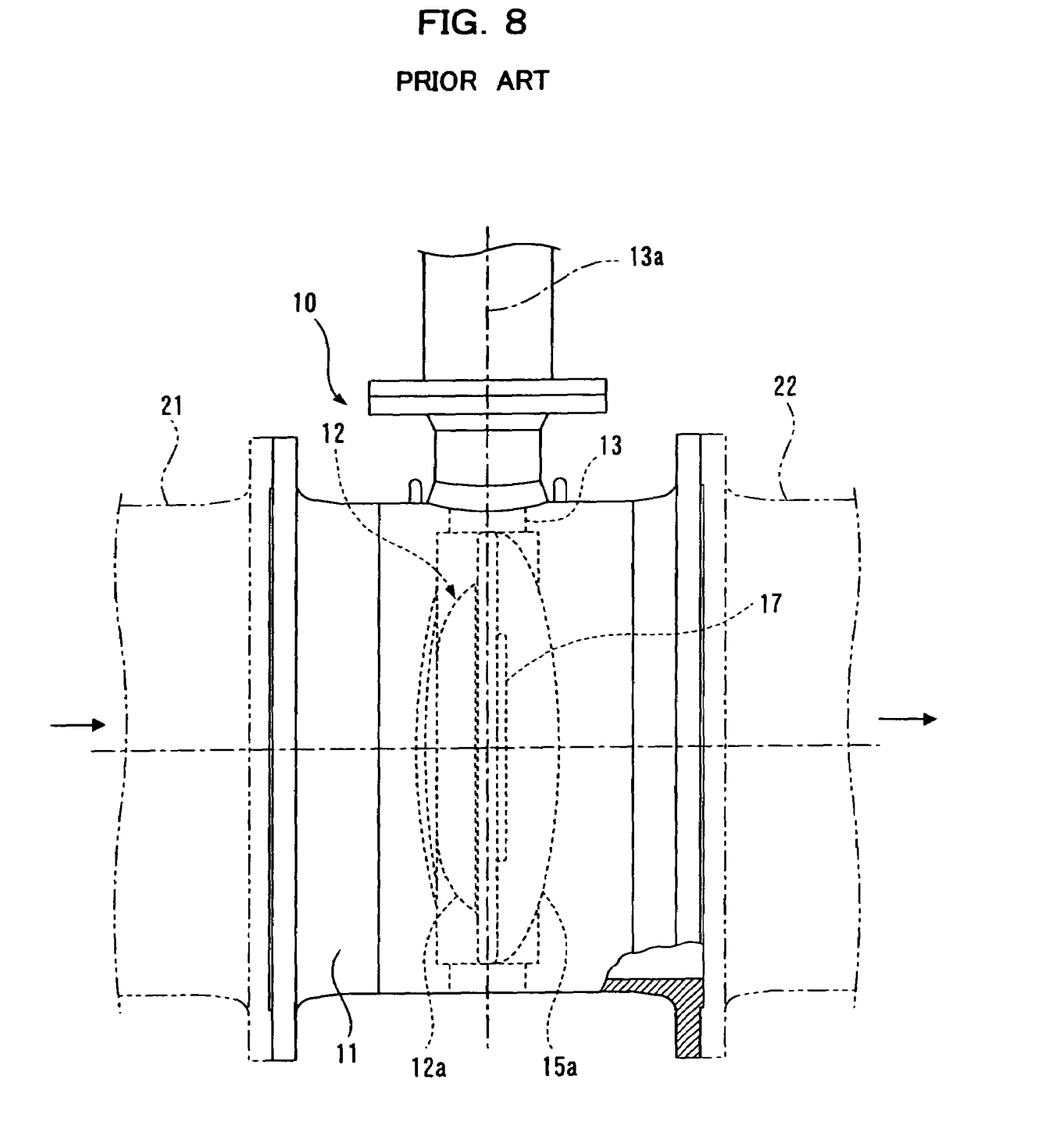
FIG. 8 is a side view of the conventional butterfly valve with a water-filling function.

Specifically, as shown in FIG. 8, an upstream pipe 21 and a downstream pipe 22 are connected to both sides of a valve casing 11 of the butterfly valve 10. Moreover, as shown in FIG. 5, in the valve casing 11 a valve body 12 is rotatably disposed around a shaft center 13a of a valve rod 13. An annular valve casing seal 14 is disposed on an inner periphery of the valve casing 11. A rim of the valve body 12 contacts with and slides on the valve casing seal 14 in a completely closed state S of the valve body 12. The valve body 12 comprises a disk tail portion 15a, 15b at each of a right and left pair of valve body pieces 12a, 12b that have the valve rod 13 therebetween. The pair of disk tail portions 15a, 15b are disposed at the back side of the valve body 12 in a rotation direction C when opening the valve body 12.

Each of the both disk tail portions 15a, 15b stands on the face of a flat portion of the valve body 12, and has an outer periphery that is spherically curved so as to contact with and slide on the valve casing seal 14. A water flow hole 17 is formed on each of the both disk tail portion 15a, 15b. One end of the water flow hole 17 is opened to the outer peripheries of the disk tail portions 15a, 15b, and the other end of same is opened to the other sides of the disk tail portions 15a, 15b, that is, the back side of the valve body 12 when the valve body 12 is operated to be opened.

Figure 6:
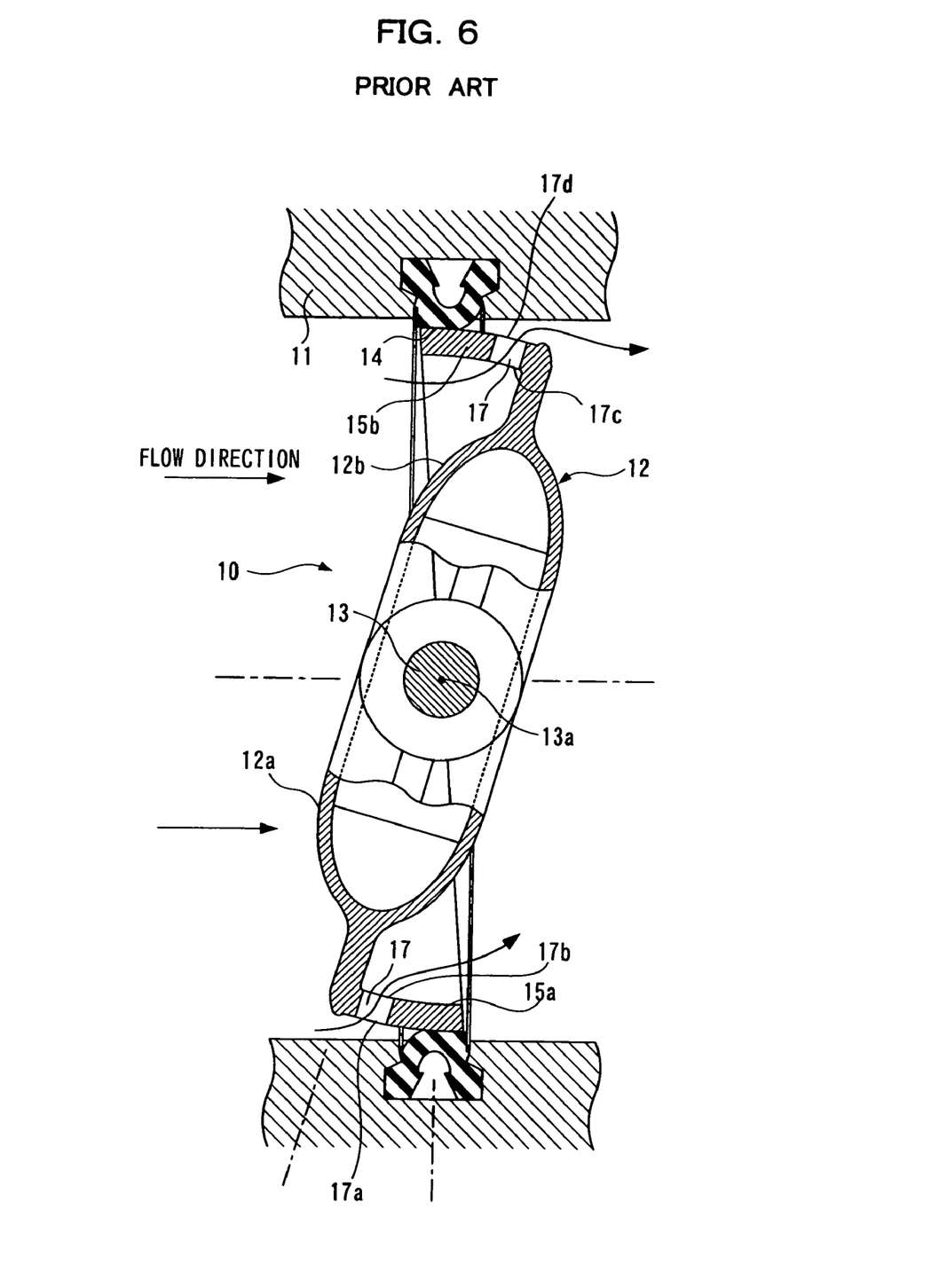
FIG. 6 is a cross sectional view at a right angle with respect to a shaft center of a valve rod of the conventional butterfly valve with a water-filling function, showing a state in which water is being filled with the valve body opened to a small degree.
Figure 7:
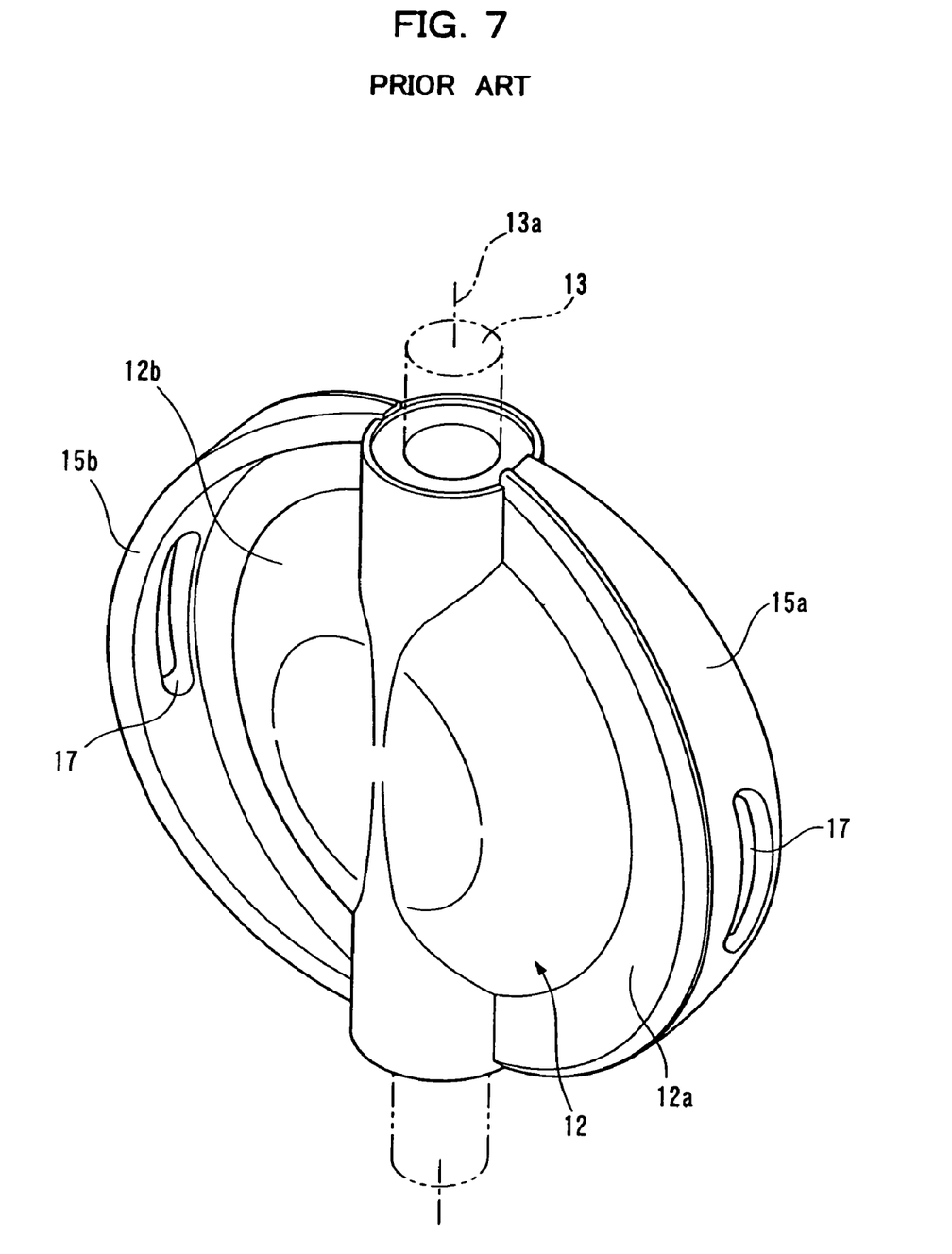
FIG. 7 is a perspective view of the valve body of the conventional butterfly valve with a water-filling function.

As shown in FIG. 6, in the disk tail portion 15a provided in the valve body piece 12a which is turned toward the upstream side in the opening operation, the water flow hole 17 forms an inflow port 17a at the opening on the outer periphery of the disk tail portion 15a, and an outlet port 17b at the opening on the back side of the valve body 12. Furthermore, in the disk tail portion 15b provided in the valve body piece 12b which is turned toward the downstream in the opening operation, the water flow hole 17 forms an inflow port 17c at the opening on the back side of the valve body 12, and an outlet port 17d at the opening on the outer periphery of the disk tail portion 15b. As shown in FIG. 7, the opening of the water flow hole 17 has an oblong shape so as to follow the circumferential direction of the valve body 12. It should be noted that the total opening area of the openings of the water flow holes 17 is set to be the same as the cross-section of the flow channel of the sub-pipe 3 shown in FIG. 4. Specifically, the total opening area of the water flow holes is ¹⁄₂₅ of the pipes 21, 22 connected to the butterfly valve 10.

It should be noted that the valve rod 13 is rotated by a switching device including a reducer, and a handle or a motor.

According to the above description, the valve body 12 is in a completely closed state in the beginning of the operation for water filling, as shown in FIG. 5, and the butterfly valve 10 is opened to a small degree to fill the downstream pipe with water in small amounts in order to prevent the pipe from being damaged by rapid filling of water. Specifically, as shown in FIG. 6, the valve body 12 is opened to a small degree (approximately 15 through 20%) by the opening operation. Accordingly, the water flow holes 17 are opened completely in a state in which the outer peripheries of the disk tail portions 15a, 15b contact with and slide on the valve casing seals 14.

By opening the valve body 12 to a small degree and opening the water flow holes 17 completely, an upstream region and a downstream region in the valve casing 11 which is separated by the valve body 12 are communicated with the disk tail portions 15a, 15b only via the water flow holes 17. Consequently, the water flowing from the upstream pipe 21 into the valve casing 11 is guided to the downstream pipe 22 via the water flow holes 17.

In this case, the amount of water flowing through the water flow holes 17 is previously set so as to correspond to the shape of the flow channel such as the cross-section of the flow channel of the water flow hole 17, thus the downstream pipe 22 can be filled at a constant flow rate, and required time from the start of water filling till the pipe becomes full of water can be computed beforehand.

Figure 2:
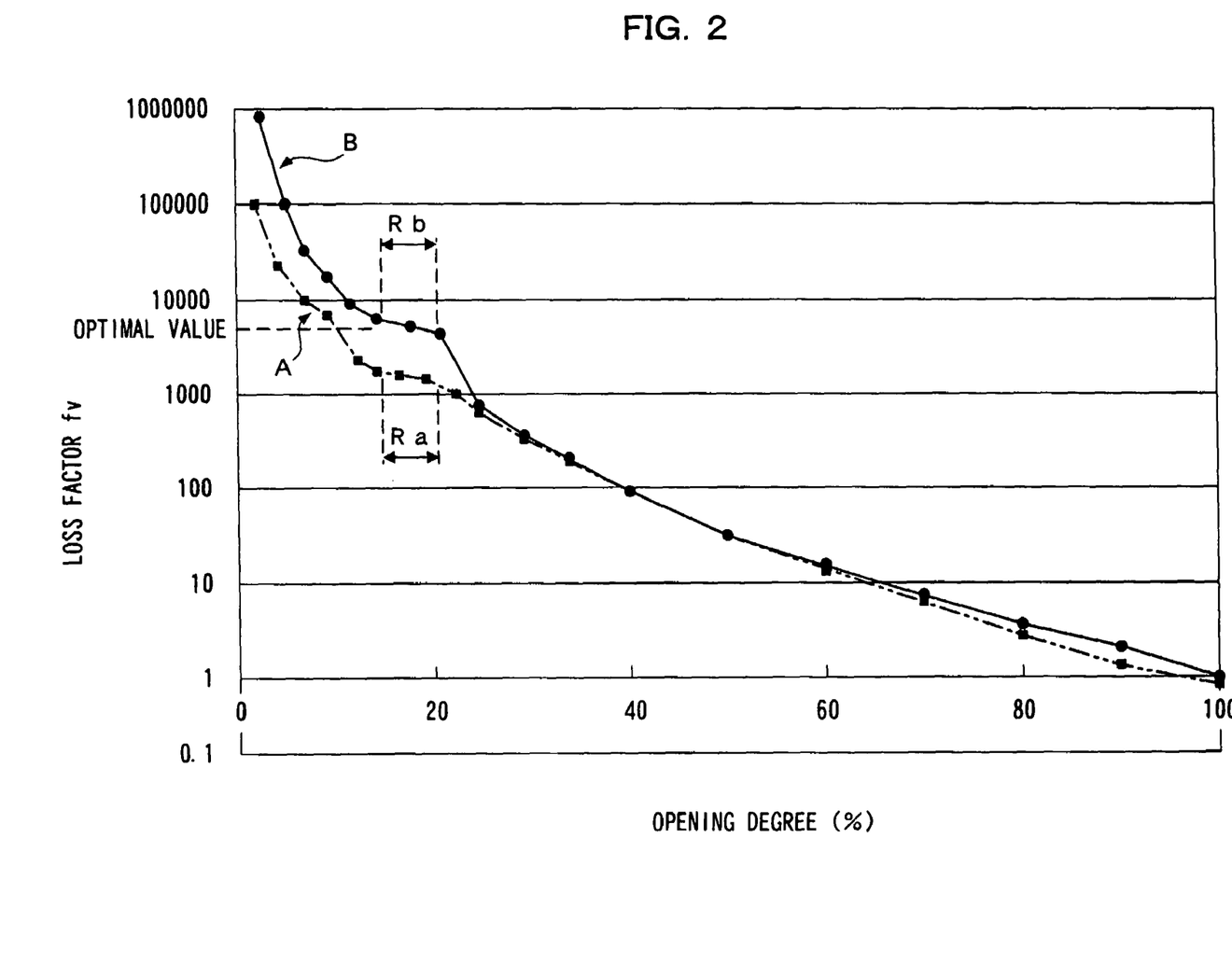
FIG. 2 is a graph showing a relationship between the loss factor and the opening degree of the butterfly valve with a water-filling function of the first embodiment of the present invention, with respect to that of a conventional butterfly valve with a water-filling function.

It should be noted that a graph A that is drawn with a chain double-dashed line in FIG. 2 shows the relationship between the opening degree (%) of the valve body 12 of the conventional butterfly valve with a water-filling function 10 and loss factor. When the opening degree is 20% or less the outer peripheries of the disk tail portions 15a, 15b contact with and slide on the valve casing seals 14, and when the opening degree is between 15 and 20% the water flow holes 17 are opened completely. According to the above description, the graph A slopes downward as the opening degree of the valve body 12 rises, whereby the loss factor decreases. However, when the opening degree is between 15 and 20%, the water flow holes 17 are opened completely, thus a steady region Ra, which indicates that the loss factor is a constant value, appears. It should be noted that in the case of water filling as described above, the opening degree is 20% or less.

Here, the loss factor fv can be obtained in the following equation 1 in which the water filling velocity in the upstream pipe 21 in the butterfly valve 10 when performing filling of water from the water flow hole 17 is V (m/s), the pressure head upstream of the butterfly valve 10 is H (m), and the acceleration of gravity is g (=9.8 m/s²).

$$fv=H\times 2\times g/V^2 \quad \text{Equation 1}$$

For example, when the butterfly valve 10 is provided in a water pipe line, the water filling velocity V when filling water is performed is generally set to 0.5 m/s with safety in mind. The upstream pressure head H is set to 100 m (=9.8×10⁵Pa) based on standard hydraulic conditions of water pipe lines. The loss factor fv obtained by the above equation 1 in this condition is approximately 8000 (to be precise, fv=7845). Therefore, in order to perform filling of water at a water filling velocity V of 0.5 m/s, it is necessary to maintain the opening degree of the valve body 12 at approximately 10% according to the graph A of FIG. 2.

However, the opening degree of the valve body 12 easily fluctuates in accordance with backlashing of the switching device or the like. If the opening degree of the valve body 12 slightly fluctuates from the 10%, the loss factor fv largely changes in accordance with this fluctuation, thus the water filling velocity V changes from 0.5 m/s, whereby the amount of water filling also fluctuates. Therefore, there is a problem that the required time between the start of water filling and when the pipe becomes full of water differs from a previously calculated required time.

The present invention is, therefore, to provide a butterfly valve having a water-filling function which can minimize the difference between an actual required time from the start of water filling till a pipe becomes full of water, and a previously calculated required time.

SUMMARY OF THE INVENTION

The present invention is a butterfly valve with a water-filling function comprising a valve casing, a valve casing seals disposed inside a valve casing, a valve rod, a valve body that rotates around a shaft center of a valve rod and comes into a sliding contact with the valve casing seal at a completely closed position, a pair of disk tail portions each provided at the back side of the valve body in a rotation direction in an opening operation of the valve body, the disk tail portions each having a spherically curved outer periphery that comes into sliding contact with the valve casing seals, a water flow hole formed in at least one of the disk tail portions, the water flow hole having one end opened to the outer periphery of the disk tail portion and the other end opened to the back side of the valve body, and a steady region where, in a relationship between a loss factor and an opening degree of the valve body, the loss factor stays substantially constant in value with respect to a change of the opening degree of the valve body when water is being filled from the water flow hole, wherein water filling velocity inside an upstream pipe of the butterfly valve for filling water from the water flow hole, and pressure head upstream of the butterfly valve are set, an optimal value of the loss factor is determined based on the set water filling velocity and the set pressure head, and the total opening area of the water flow hole is set so that the loss factor becomes the optimal value in the steady region.

According to such a configuration, the loss factor becomes the optimal value in the steady region, thus, when water filling is performed, water is filled in at the set water filling velocity by keeping the opening degree of the valve body at a predetermined opening degree corresponding to the steady region.

In this case, even in the case where the opening degree of the valve body fluctuates slightly from the predetermined opening degree, change in the loss factor with respect to the fluctuation of the opening degree of the valve body becomes small as long as the fluctuation of the opening degree of the valve body is within the steady region. Therefore, fluctuation of the water filling velocity is reduced, and the amount of water filling is controlled to be stable. Consequently, the difference can be reduced between an actual required time from the start of water filling till a pipe becomes full of water, and a previously calculated required time.

Further, the butterfly valve with a water-filling function according to the present invention is characterized in that the water filling velocity is set to approximately 0.5 m/s, the pressure head is set to approximately 100 m, and the optimal value of the loss factor in this case is approximately 8000.

According to such a configuration, the loss factor becomes the optimal value in the steady region, which is 8000, thus, when filling of water is performed, water is filled in at the set water filling velocity, which is approximately 0.5 m/s, by keeping the opening degree of the valve body at the predetermined opening degree corresponding to the steady region.

In this case, even when the opening degree of the valve body fluctuates slightly from the predetermined opening degree, change in the loss factor (=approximately 8000) with respect to the fluctuation of the opening degree of the valve body becomes small as long as the fluctuation of the opening degree of the valve body is within the steady region. Therefore, fluctuation of the water filling velocity (=approximately 0.5 m/s) is reduced, and the amount of water filling is controlled to be stable. Consequently, the difference can be reduced between an actual required time from the start of water filling till a pipe becomes full of water, and a previously calculated required time.

Furthermore, the butterfly valve with a water-filling function according to the present invention is characterized in that the water flow hole is formed only in one of the disk tail portions, which is turned toward the upstream side in the opening operation.

According to such a configuration, when filling of water is performed, fluid that has passed the water flow hole from the upstream side flows from the back side of the valve body toward the central direction of the downstream flow channel, thus cavitation is prevented from occurring. Moreover, in this configuration, as compared to the case in which the water flow hole is formed in each of the disk tail portions, manufacturing manhours can be reduced, thereby reducing costs.

DESCRIPTION OF THE PREFERRED EMBODIMENTS

The present invention is described in detail with reference to the attached drawings.

Figure 1:
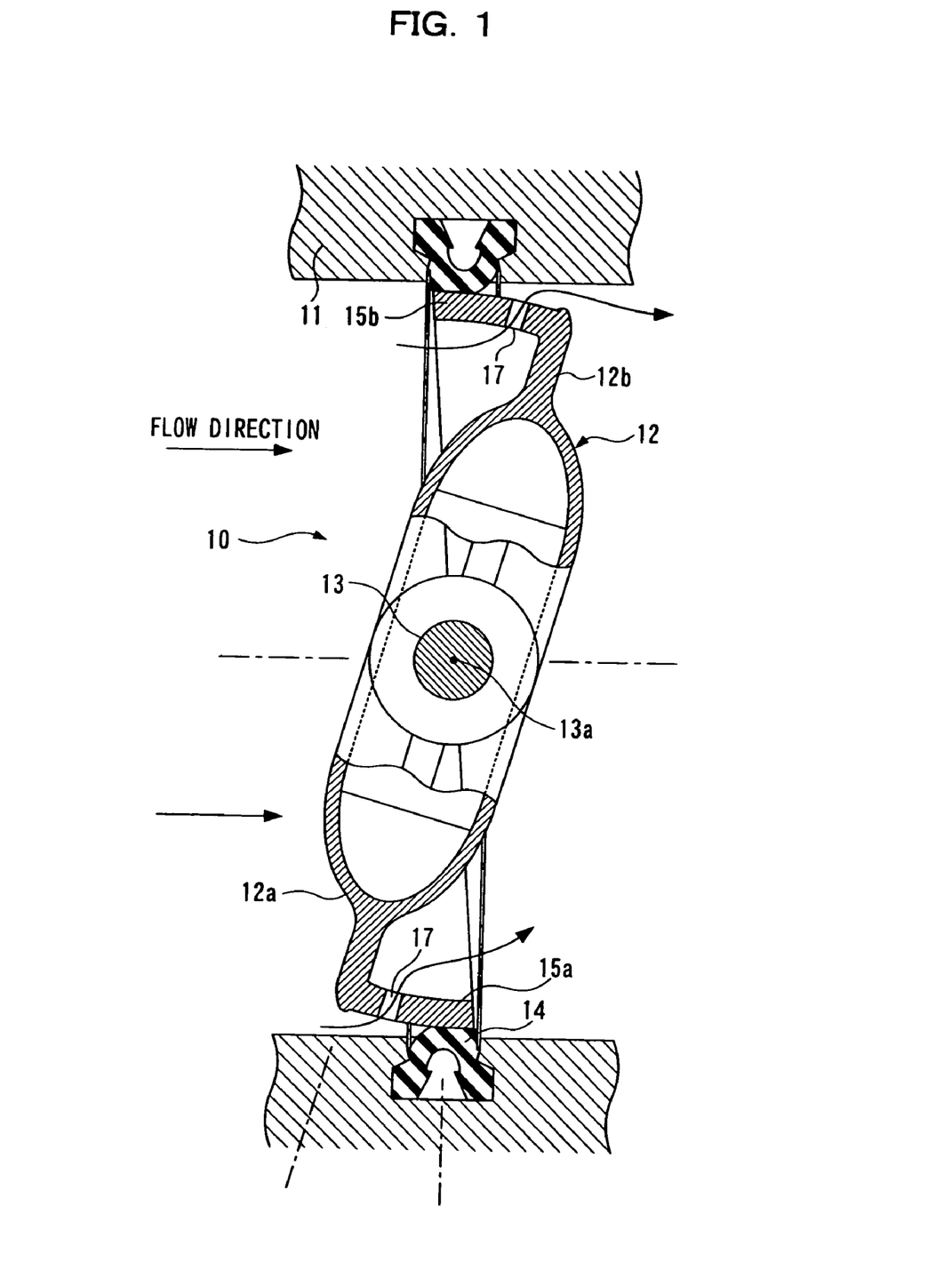
FIG. 1 is a cross sectional view at a right angle with respect to a shaft center of a valve rod of a butterfly valve with a water-filling function according to a first embodiment of the present invention.

As shown in FIG. 1, a basic configuration of the butterfly valve with a water-filling function 10 in a first embodiment of the present invention is same as the configuration of the conventional butterfly valve with a water-filling function 10 (see FIG. 5 through FIG. 8) that has been described hereinbefore. The configuration of the butterfly valve with a water-filling function 10 in the first embodiment of the present invention is described hereinafter.

Specifically, a valve casing 11 of the butterfly valve 10 is connected to an upstream pipe 21 and a downstream pipe 22 at its both sides (see FIG. 8). Further, as shown in FIG. 1, in the valve casing 11 a valve body 12 is rotatably disposed around a shaft center 13a of a valve rod 13. An annular valve casing seal 14 is disposed on an inner periphery of the valve casing 11. A rim of the valve body 12 contacts with and slides on the valve casing seal 14 in a completely closed position S of the valve body. The valve body 12 comprises a disk tail portion 15a, 15b at each of a right and left pair of valve body pieces 12a, 12b that have the valve rod 13 therebetween. The pair of disk tail portions 15a, 15b are disposed at the back side of the valve body 12 in a rotation direction C when opening the valve body 12.

Each of the both disk tail portions 15a, 15b stands on the flat face of the valve body 12, and has an outer periphery that is spherically curved so as to contact with and slide on the valve casing seal 14. A water flow hole 17 is formed on each of the both disk tail portion 15a, 15b. One end of the water flow hole 17 is opened to the outer peripheries of the disk tail portions 15a, 15b, and the other end of same is opened to the other sides of the disk tail portions 15a, 15b, that is, the back side of the valve body 12 when the valve body 12 is operated to be opened.

In the disk tail portion 15a provided in the valve body piece 12a which is turned toward the upstream side in the opening operation, the water flow hole 17 forms an inflow port 17a at the opening on the outer periphery of the disk tail portion 15a (see FIG. 6), and an outlet port 17b at the opening on the back side of the valve body 12 (see FIG. 6). Furthermore, in the disk tail portion 15b provided in the valve body piece 12b which is turned toward the downstream in the opening operation, the water flow hole 17 forms an inflow port 17c at the opening on the back side of the valve body 12 (see FIG. 6), and an outlet port 17d at the opening on the outer periphery of the disk tail portion 15b (see FIG. 6). The opening of the water flow hole 17 has an oblong shape so as to follow the circumferential direction of the valve body 12.

It should be noted that the valve rod 13 is rotated by a switching device which is composed of a reducer and a handle, or a motor and the like.

According to the above description, when the butterfly valve 10 shown in FIG. 1 is provided in a water pipe line, an optimal value of loss factor fv (=approximately 8000) is determined by the set water filling velocity V (=approximately 0.5 m/s) and the set pressure head H (=approximately 100 m) on the basis of the above equation 1. As illustrated with a graph B that is drawn with a solid line in FIG. 2, the total opening area of the both water flow holes 17 is set so that a steady region Rb in the relationship between the opening of the valve body 12 and the loss factor becomes the optimal value of the loss factor fv (=approximately 8000).

In the prior art, the total opening area of the both water flow holes 17 is set to be 1/25 of the cross-section of the flow channels of the pipes 21, 22 connected to the butterfly valve 10 so that the total opening area becomes equal to the cross-section of the flow channel of the sub-pipe 3 (see FIG. 4). In this case, as shown with the graph A in FIG. 2, the steady region Ra is positioned in the vicinity of loss factor fv=approximately 2000. In the present embodiment, however, the total opening area of the both water flow holes 17 is set to be ½ of the conventional example, that is, 1/50 of the cross-section of the flow channels of the pipes 21, 22 connected to the butterfly valve 10, whereby the steady region Rb rises to the vicinity of the optimal vale of loss factor fv (=approximately 8000), as described above.

According to the above description, the steady region Rb is equivalent to an opening degree of approximately 15 through 20%, and, loss factor fv of the butterfly valve 10 becomes the optimal value of the loss factor fv (=approximately 8000) by filling water in while keeping the opening degree of the valve body 12 at a predetermined opening degree in the range of approximately 15 to 20% as shown in FIG. 1, whereby water is filled in at the set water filling velocity V (=approximately 0.5 m/s). At this moment, even in the case in which the opening degree of the valve body 12 fluctuates slightly from the predetermined opening degree, change in the loss factor fv (=approximately 8000) with respect to the fluctuation of the opening degree of the valve body 12 becomes small as long as the fluctuation of the opening degree of the valve body 12 is within the steady region Rb (i.e., the opening degree in the range of 15 to 20%) Therefore, fluctuation of the water filling velocity V (=approximately 0.5 m/s) is reduced, and the amount of water filling is controlled to be stable. Consequently, the difference can be reduced between an actual required time from the start of water filling till a pipe becomes full of water, and a previously calculated required time.

It should be noted that, when setting the pressure head H to a value higher than approximately 100 m, or wishing to reduce the amount of water filling, the opening degree may be reduced to approximately 15% or less to use the valve body. In the first embodiment, although the water flow hole 17 is formed in each of the disk tail portions 15a, 15b, a plurality of water flow holes maybe formed in each of the disk tail portions.

Figure 3:
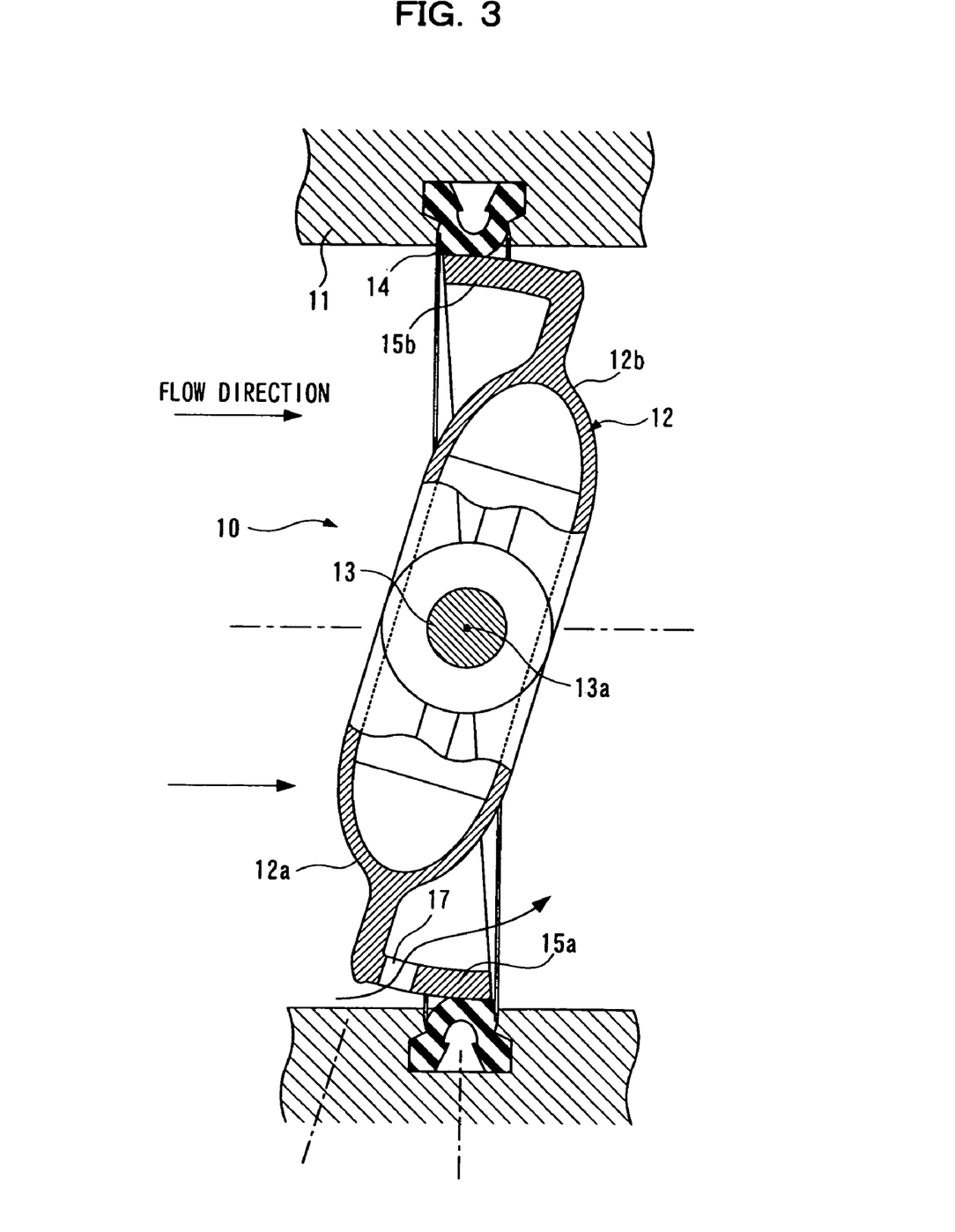
FIG. 3 is a cross sectional view at a right angle with respect to a shaft center of a valve rod of a butterfly valve with a water-filling function according to a second embodiment of the present invention.

In the first embodiment, the water flow hole 17 is formed in each of the disk tail portions 15a, 15b, but, in a second embodiment that is described hereinafter, the water flow hole 17 is formed only in one of the disk tail portions 15a, 15b, that is, only in the disk tail portion 15a that is turned toward the upstream side in the opening operation, as shown in FIG. 3. It should be noted in this case as well that, as in the first embodiment described above, the total opening area of the both water flow holes 17 is set to be ½ of the conventional example, that is, 1/50 of the cross-section of the flow channels of the pipes 21, 22 connected to the butterfly valve 10 (see FIG. 8).

According to the above description, when filling of water is performed while keeping the opening degree of the valve body 12 at a predetermined opening degree in the range of approximately 15 to 20%, water (fluid) that has passed the water flow hole 17 from the upstream side flows from the back side of the valve body 12 toward the central direction of the downstream flow channel, thus cavitation is prevented from occurring. Moreover, as in the first embodiment described above, compared to the case in which the water flow hole 17 is formed in each of the disk tail portions 15*a*, 15*b* (see FIG. 1), manufacturing manhours can be reduced, thereby reducing costs.

In the second embodiment, although the water flow hole 17 is formed only in the disk tail portion 15*a*, a plurality of water flow holes may be formed in the disk tail portion.

In the second embodiment, although the water flow hole 17 is formed only in the disk tail portion 15*a*, one or a plurality of water flow holes 17 may be formed only in the disk tail portion 15*b*.

Moreover, in each of the embodiments described above, the water flow hole 17 is formed to have an oblong shape, but it may be formed into other shape such as circular or polygonal shape.

Furthermore, in each of the embodiments described above, the water filling velocity V is set to approximately 0.5 m/s, the pressure head H is set to approximately 100 m based on standard hydraulic conditions of water pipe lines, and the optimal value of the loss factor fv is determined to be approximately 8000 based on both of the above values. However, these values are merely an example, and thus, are not limited to these values. In addition, the total opening area of the water flow holes 17 is set to be approximately 1/50 of the cross-section area of the pips 21, 22, but it may be set to other value.

What is claimed is:

1. A butterfly valve with a water-filling function, comprising:
    a valve casing;
    a valve casing seal disposed inside the valve casing;
    a valve rod;
    a valve body that rotates around a shaft center of the valve rod and comes into sliding contact with the valve casing seal at a completely closed position;
    a pair of disk tail portions each provided at the back side of the valve body in a rotation direction in an opening operation of the valve body, the disk tail portions each having a spherically curved outer periphery that comes into sliding contact with the valve casing seals;
    a water flow hole formed in at least one of the disk tail portions, the water flow hole having one end opened to the outer periphery of the disk tail portion and the other end opened to the back side of the valve body; and
    a steady region where, in a graph of a relationship between a loss factor and an opening degree of the valve body, a change in the loss factor with respect to a change of the opening degree of the valve body is smaller than a change in the loss factor with respect to a change of the opening degree around the steady region, wherein
    water filling velocity V inside an upstream pipe of the butterfly valve for filling water from the water flow hole is set to approximately 0.5 m/s, and pressure head H upstream of the butterfly valve is set to approximately 100 m,
    a loss factor value fv determined by an equation below based on the set water filling velocity V and the set pressure head H is approximately 8000:

$$fv = H \times 2 \times g / V^2 \; (g = \text{acceleration of gravity})$$

a total opening area of the water flow hole is set such that the loss factor in the steady region generally equals the loss factor value determined by the above equation, and
    the opening degree of the valve body is kept at an opening degree corresponding to the steady region, when water filling is performed.

2. The butterfly valve with a water-filling function according to claim 1, wherein the water flow hole is formed in only one of the disk tail portions that turns toward the upstream side in the opening operation.

* * * * *